Figure 1

June 5, 1956 G. J. PIEROTTI ET AL 2,749,291
PURIFICATION OF HYDROGEN PEROXIDE
Filed Jan. 29, 1954 3 Sheets-Sheet 2

Inventors: Gino J. Pierotti
William R. Keeler
Roy J. Evans
Robert E. Vincent
By: Alan C. Batchelder
Their Agent June 5, 1956 G. J. PIEROTTI ET AL 2,749,291
PURIFICATION OF HYDROGEN PEROXIDE
Filed Jan. 29, 1954 3 Sheets-Sheet 3

Figure 4

Inventors: Gino J. Pierotti
William R. Keeler
Roy J. Evans
Robert E. Vincent
By: Alan C. Batchelder
Their Agent United States Patent Office 2,749,291
Patented June 5, 1956

2,749,291

PURIFICATION OF HYDROGEN PEROXIDE

Gino J. Pierotti, El Cerrito, William R. Keeler and Roy J. Evans, Berkeley, and Robert E. Vincent, Atherton, Calif., assignors to Shell Development Company, New York, N. Y., a corporation of Delaware Application January 29, 1954, Serial No. 407,086

17 Claims. (Cl. 202—39)

This invention relates to a process for purifying hydrogen peroxide. More particularly, the present invention relates to a process for purifying hydrogen peroxide initially present in aqueous solution comprising lower aliphatic alcohol, lower aliphatic carbonyl compound corresponding to the alcohol, and organic impurities, such organic impurities comprising low molecular weight oxygenated compounds including peroxides and other labile organics.

The purification of hydrogen peroxide initially present in aqueous mixture with reactive organic materials presents a number of distinctive problems owing to the tendency of hydrogen peroxide to oxidize or otherwise ract with such organic materials. Formation of difficultly separable complexes of hydrogen peroxide and oxygenated organic materials, or of organic peroxides, constitutes one of the problems to be obviated. The danger of violent decomposition which is associated with the co-presence of hydrogen peroxide and reactive organic materials, presents another and a serious problem. Also to be mentioned is the likelihood of excessive losses of the hydrogen peroxide (assuming that explosive decomposition can be avoided) caused by slow oxidation of the organics by the hydrogen peroxide. On top of all this are the difficulties that are encountered when the organic impurities themselves are unstable, or labile; this difficulty is one of particular moment since the methods heretofore known in the art for recovery and purification of hydrogen peroxide are not well suited to its clean separation from labile organic materials which themselves undergo chemical change during the course of the separation.

It is an object of this invention to provide a method for effecting recovery or purification of hydrogen peroxide in high yields and at high purity, from aqueous mixtures comprising hydrogen peroxide and oxygenated organic materials including lower aliphatic alcohol, corresponding carbonyl compound, and other oxygenated organics. Another object of the invention is a practical method for carrying out the recovery or purification utilizing distillatory procedures and operating in a continuous manner. A still further object is a method for doing this safely, economically, and with high recovery of the hydrogen peroxide.

The process of the invention may be described with reference to the drawings which form a part of the present specification and wherein.

The method of the present invention for producing pure highly concentrated (e. g., 85% to 95% hydrogen peroxide, by weight) hydrogen peroxide, comprises conveying the hydrogen peroxide, initially present in solutions of the character hereinbefore and hereinafter defined, successively through partial evaporation and rectification in each of a plurality of successive stages. Intermediately to two of the evaporation-rectification stages condensate containing hydrogen peroxide, i. e., bottoms fraction from the immediately preceding rectification, is stripped with steam to volatilize organic impurities therefrom. The liquid residues from the partial evaporations of the respective stages are combined and subjected to a separate stripping operation, utilizing as the stripping medium the vaporous effluent from the first stripping operation. Volatile impurities and steam recycled from the first stripping operation to the second stripping operation are recycled from the second stripping operation together with hydrogen peroxide stripped from the combined liquid residues to an evaporation-rectification stage preceding the first-mentioned stripping operation, wherein the mixture is rectified with rejection of volatile impurities to the overhead fraction. Non-volatile and but slightly volatile impurities are withdrawn in the substantially peroxide-free bottoms product of the second stripping operation, and purified, concentrated hydrogen peroxide is recovered as condensate of the terminal evaporation-rectification stage.

Figure 1:
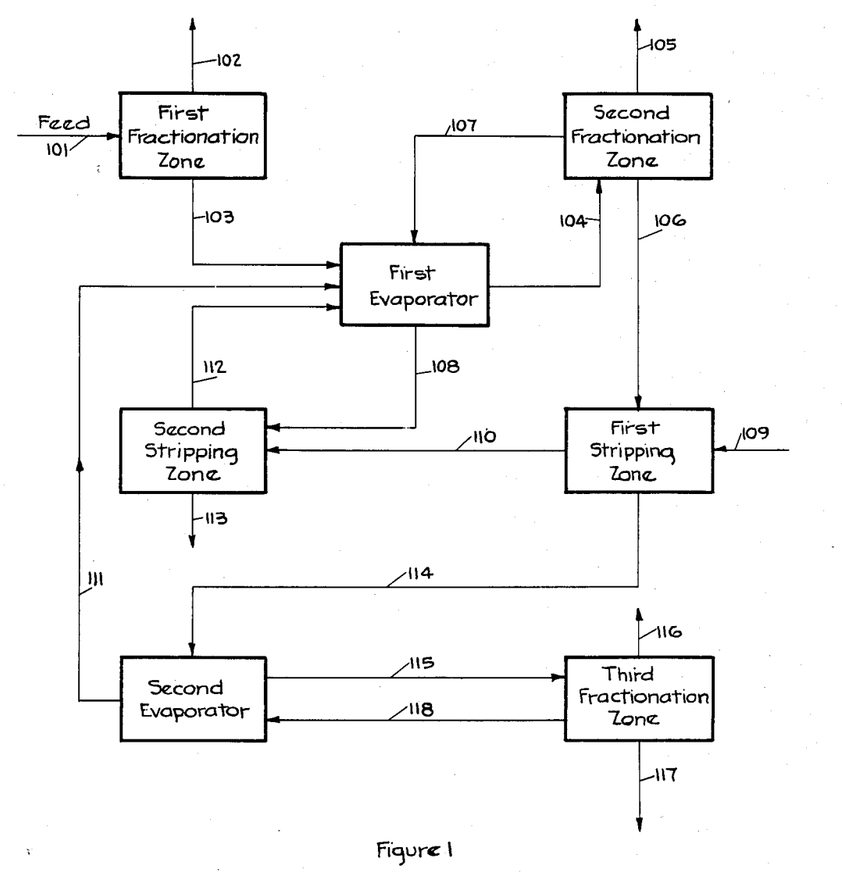
Figure 1 shows schematically the method of the invention as it may be applied to production of pure concentrated (e. g., 80 to 95%) hydrogen peroxide.

Turning to Figure 1 of the drawings, the sequence of operations can be described in greater detail with reference to the schematic flow diagram shown in the figure. An aqueous mixture comprising hydrogen peroxide, lower aliphatic alcohol, particularly isopropyl alcohol, corresponding carbonyl compound, e. g., acetone when the alcohol is isopropyl alcohol, and other oxygenated organic compounds, is introduced into the purification via line 101. Impurities which may be present include low molecular weight acids, alcohols, esters, aldehydes and ketones, organic peroxides, and labile complexes of hydrogen peroxide with such oxygenated organic materials. Inorganic components, such as salts, e. g., phosphates if a phosphate stabilizer has been included, may be present. The solution may contain from about 5% to about 20%, more typically from about 5% to about 12%, hydrogen peroxide by weight, the balance being the organic materials in major amount and water in minor amount. The solution is fractionated in the first fractionating zone to take overhead via line 102 an aqueous mixture comprising the greater part of the alcohol and corresponding carbonyl compound. The fractionation is conducted under pressures between about 200 mm. Hg and about 1000 mm. Hg and preferably under subatmospheric pressure, between about 200 mm. Hg and about 700 mm. Hg, in the presence of sufficient water (water being added if necessary) to allow the alcohol-water azeotrope to pass overhead and an about 20 to 35% by weight aqueous solution of hydrogen peroxide to be withdrawn as bottoms product via line 103.

The liquid bottoms from the first fractionation zone are conveyed via line 103 to the first stage of evaporation-rectification. In the evaporator, which is operated under a subatmospheric pressure preferably of about 100 to 250 mm. Hg, the solution is partially evaporated to leave a liquid residue containing between about 50% and about 65% hydrogen peroxide by weight. The vapors, which have a composition determined by the vapor-liquid equilibria for the hydrogen peroxide-water system at the pressure employed and the composition of the liquid residue, are conveyed via line 104 to the second fractionation zone, where they are rectified. Water and volatile organics are withdrawn overhead from the second fractionation zone via line 105. Residual organics, not withdrawn overhead, are condensed along with some hydrogen peroxide and water and are accumulated in the liquid bottoms product of the rectification. The bottoms product is withdrawn from the rectification zone via line 106 and conveyed to the first stripping zone. If desired, some of the overhead product from the rectification may be returned to the evaporator via line 107 to aid in control of the concentration of hydrogen peroxide in the liquid evaporation residue.

The liquid residue from the evaporator is withdrawn via line 108 and conveyed therethrough to the second stripping zone.

A stream of steam is introduced into the first stripping zone via line 109 and in the first stripping zone is brought into countercurrent contact with the liquid condensate introduced via line 106. The stripping operation desirably is conducted under reduced pressure, preferably from about 300 to 600 mm. Hg pressure. The amount of steam introduced via line 109 may be varied according to the requirements of the operation. Typically, an about equal amount of steam compared to the liquid feed introduced via line 106, may be used; this, however, is subject to variation. The stripping desirably is conducted with partial reflux of the vapors; this is effected by cooling an upper level of the stripping zone, above the level of introduction of liquid feed, as by a cooling coil or reflux condenser or by direct introduction of cold water into an upper level of the stripping zone.

In the first stripping operation, residual organics are stripped from the hydrogen peroxide solution without substantial volatilization of hydrogen peroxide and the content of carbonaceous impurities in the solution is reduced to virtually nil. The volatilized organics together with small amounts of hydrogen peroxide and steam, are conveyed without intervening condensation of the vapors to the second stripping zone via line 110. In the second stripping zone this vaporous mixture is brought into countercurrent contact with liquid residue from the first evaporator. Hydrogen peroxide together with small quantities of volatile organics is stripped from the liquid residue in the second stripping zone, and the resulting vaporous mixture, comprising volatile organics recycled from the first stripping zone in the vapors passing through line 110, is reintroduced into the preceding evaporation-rectification stage of the process via line 112. Volatile impurities removed in the two stripping stages thus pass by recycle through the first evaporation zone and the second fractionation zone and are withdrawn from the system in the effluent from line 105; non-volatile and but slightly volatile impurities are withdrawn via line 113 in the liquid bottoms product of the second stripping zone.

The hydrogen peroxide solution which is formed as the bottoms product of the first stripping operation is conveyed via line 114 to a second evaporation-rectification stage. It is partially evaporated in the second evaporator under subatmospheric pressure to yield a liquid residue containing preferably between 65% and 80% hydrogen peroxide by weight and a vaporous mixture of hydrogen peroxide and water. The vaporous mixture is conveyed from the second evaporator via line 115 to the third fractionation zone wherein it is rectified to yield water as an overhead fraction withdrawn through line 116, and aqueous hydrogen peroxide solution of desired concentration withdrawn as bottoms product via line 117, with partial reflux of water, if desired, to the evaporator via line 118. Liquid residue from the evaporator is recycled via line 111 to the first evaporator for purification and recovery of the hydrogen peroxide therein. If desired, this liquid residue may be recycled in whole or in part to the second stripping zone.

Figure 2:
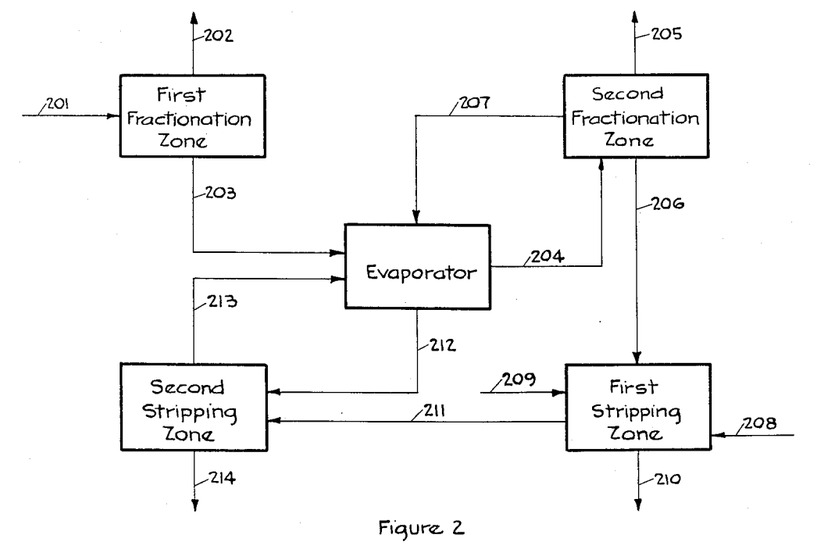
Figure 2 shows schematically a modified method of the invention which is especially adapted for the production of purified hydrogen peroxide at the more customary commercial concentrations, e. g., 30% to 50%.

According to the modified method illustrated in Figure 2 of the drawings, there is obtained in high yields and with efficiency of operation, hydrogen peroxide solution which meets the commercial requirements for purity and stability of a 30-50% by weight aqueous hydrogen peroxide solution.

According to this modified method of the invention, the crude feed, comprising an aqueous solution of hydrogen peroxide containing lower aliphatic alcohol, corresponding carbonyl compound, and other oxygenated organics including unstable or labile peroxidic materials, is introduced into the first fractionation zone via line 201. In the first fractionation zone the solution is fractionated by continuous distillation under reduced pressure, preferably between about 200 and about 700 mm. Hg, with separation of an overhead fraction comprising alcohol, carbonyl compound and water withdrawn vial line 202 and an aqueous hydrogen peroxide solution withdrawn as bottoms product via line 203. This bottoms product, which preferably will contain between about 20 and about 35% by weight hydrogen peroxide, is subjected to evaporation in an evaporator. The evaporation is conducted under reduced pressure, preferably between about 100 and about 300 mm. Hg pressure, and at a low liquid residence time in the evaporator, preferably not over 20 minutes. The rates of reflux and of feed to the evaporator are controlled so as to yield a liquid residue comprising preferably between about 50% and about 65% by weight hydrogen peroxide. Vapors produced in the evaporation comprising hydrogen peroxide, water, and volatilized organic impurities are conveyed via line 204 to the second fractionation zone wherein they are rectified to yield an aqueous overhead fraction withdrawn via line 205 and bottoms fraction comprising an aqueous hydrogen peroxide solution withdrawn vial line 206. A part of the aqueous overhead fraction may be condensed and recycled from the second fractionation zone to the evaporator vial line 207. The rectification in the second fractionation zone and the evaporation are carried out under predetermined conditions of pressure and concentration of feed to the evaporator and amount of reflux calculated to yield as bottoms product from the second fractionation zone aqueous hydrogen peroxide solution at a concentration between about 5 and 30 percentage units higher than the desired ultimate concentration.

The bottoms product from the second fractionation zone is conveyed via line 206 to the first stripping zone where it is brought into countercurrent contact with stream introduced via line 208. Further removal of organic impurities is effected in the first stripping zone by volatilization from the aqueous hydrogen peroxide solution supplied as feed to the stripping zone. A refluxing effect in the stripping zone may be brought about by introduction of distilled water into an upper portion of the zone via line 209, feed line 206 entering the intermediate level of the zone, and stream line 208 entering at a lower level of the stripping zone. By adjusting the amount of steam introduced at line 208 and liquid water introduced at line 209 there is obtained directly from the stripping zone via effluent line 210 a pure aqueous solution of hydrogen peroxide of the desired concentration, say, 30%, 50%, or an intermediate concentration.

The vaporous overhead fraction from the first stripping zone is conveyed via line 211 to the second stripping zone wherein it is brought into countercurrent contact with liquid residue introduced from the evaporator via line 212. In this second stripping zone hydrogen peroxide present in the liquid residue is volatilized from non-volatile and but slightly volatile impurities by the stripping action of the vaporous overhead product introduced from the first stripping zone via line 211. The volatilized hydrogen peroxide together with steam and volatilized organics is recycled to the evaporator system via line 213 and thence to the second fractionation zone, while nonvolatilized impurities together with water are discharged from the second stripping zone via line 214.

Figure 3:
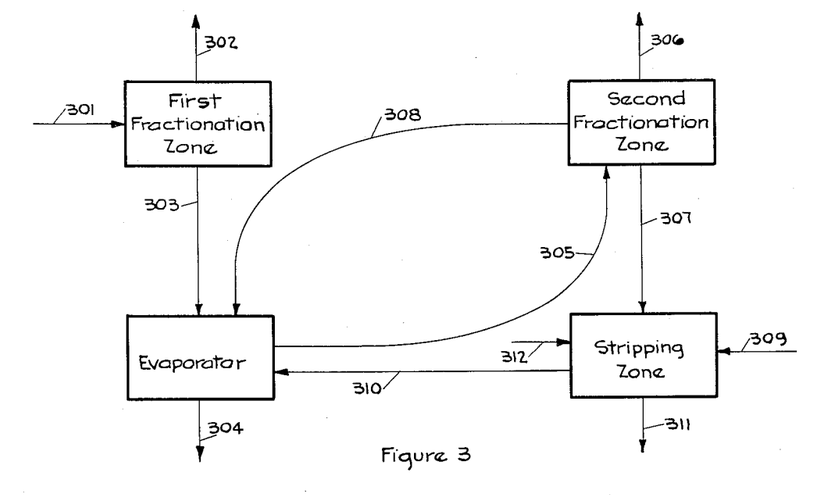
Figure 3 shows in schematic form a simplified modification of the method of the invention.

While the method of the present invention is applicable with greatest advantage in the production of pure aqueous hydrogen peroxide solutions only, from crude feeds of the character herein defined, it may be modified in a still further respect to enable production with advantage of both a pure aqueous hydrogen peroxide solution, suitable for commerce, and a less pure aqueous solution of hydrogen peroxide which may be used, for example, in chemical syntheses where stability during storage for prolonged periods of time is not required and where the presence of low concentrations of organic impurities is not objectionable. Thus modified, the process of the invention may be carried out as illustrated in Figure 3 of the drawings. In this modified process of the invention crude feed introduced via line 301 is fractionated in the first fractionation zone under conditions hereinbefore indicated with withdrawal of overhead product via line 302 and withdrawal of liquid bottoms fraction via line 303. The bottoms fraction from the first fractionation zone, introduced into the evaporator via line 303, is partially evaporated to yield an aqueous solution containing from about 50 to 65% by weight hydrogen peroxide as liquid residue and overhead fraction comprising volatilized organic impurities together with hydrogen peroxide and water at a ratio of hydrogen peroxide to water which is dependent upon the pressure, feed composition to the evaporator, and amount of reflux (if any). The liquid residue, withdrawn from the evaporator via line 304, is in itself a useful product which may be directly used, if desired, in chemical syntheses, such as hydroxylation of unsaturated organic compounds.

The vaporous fraction from the evaporator is conveyed via line 305 to a second fractionation zone wherein it is rectified to yield as overhead product water together with volatile organics, withdrawn via line 306, and as condensate an aqueous solution of hydrogen peroxide which is withdrawn via line 307. A part of the aqueous overhead fraction may be condensed and recycled from the second fractionation zone to the evaporator via line 308. The condensate withdrawn via line 307 is conveyed to a stripping zone wherein it is brought into countercurrent contact with steam introduced at line 309. By the stripping action of the steam, residual volatile organics are stripped from the liquid feed introduced into the stripping zone via line 307. The vaporous overhead product from the stripping zone may be recycled via line 310 to the evaporator, without intervening condensation, and the purified aqueous hydrogen peroxide solution withdrawn from the stripping zone via line 311. Reflux water may be introduced into the stripping zone by inlet 312, the amounts of reflux water and steam being regulated, within limits, to provide the desired concentrations of hydrogen peroxide in the effluents withdrawn via effluent lines 311 and 304.

It has been noted above that the crude hydrogen peroxide solutions which are purified according to the method of the present invention contain, in addition to the alcohol and corresponding carbonyl compound, varying but appreciable amounts of other organic impurities including labile organic peroxides and complexes of hydrogen peroxide with oxygenated organic materials which are present. While we do not intend to be bound by any theoretical considerations, it has been ascertained that in the first fractionation zone there occurs, in addition to physical separation of alcohol and corresponding carbonyl compound from aqueous hydrogen peroxide, a partial degradation or decomposition of organic materials comprising peroxy oxygen, such as labile organic peroxides or complexes. Organic products of such degradation or decomposition are removed in part with the overhead fraction from the first fractionation zone and are conveyed in part with liquid bottoms products of the first fractionation step to subsequent steps of the process wherein they are separated from hydrogen peroxide. In the evaporator there is effected a separation of hydrogen peroxide from relatively non-volatile organic materials which include both high-boiling peroxidic materials and other oxygenated organic materials, which other oxygenated organic materials tend to form high-boiling peroxides or complexes upon reaction with hydrogen peroxide. Volatilized organics and hydrogen peroxide are rapidly separated from each other in the second fractionation zone under conditions which minimize possible recombination to yield high-boiling peroxidic materials and such volatilized organics are continuously withdrawn from the system in the overhead product from the second fractionation zone. The partially purified hydrogen peroxide solution obtained as condensate from the second fractionation zone then is further purified in the first stripping zone utilizing the stripping action of steam. By recycling this overhead fraction from the first stripping zone to the second stripping zone as in the methods illustrated in Figures 1 and 2 or to the evaporator as in the method of Figure 3, in both cases without intervening condensation, the latent heat of the stripping steam is conserved for utilization in the evaporation-rectification stage and small amounts of hydrogen peroxide volatilized therewith are recovered. Furthermore, by recycling this overhead fraction from the first stripping zone, organic materials which are volatilized from the hydrogen peroxide solution in the first stripping zone, including valuable acids and other oxygenated organic materials, together with valuable organic materials initially volatilized in the firs evaporation-rectification stage, are collected together in the overhead effluent from the second fractionation zone, which effluent may be suitably processed to recover the organics contained therein. In the process as illustrated in Figures 1 and 2, a further degradation of high-boiling peroxidic materials to yield hydrogen peroxide occurs in the second stripping operation. The degradation or decomposition of these high-boiling peroxidic materials appears to involve equilibrium relationships; the continuous removal, in the second stripping operation, of hydrogen peroxide which is liberated by the degradation or decomposition of such high-boiling peroxidic materials, contributes appreciably to the efficacy of the recovery of their content of oxygen in the form of aqueous hydrogen peroxide solution.

Figure 4:
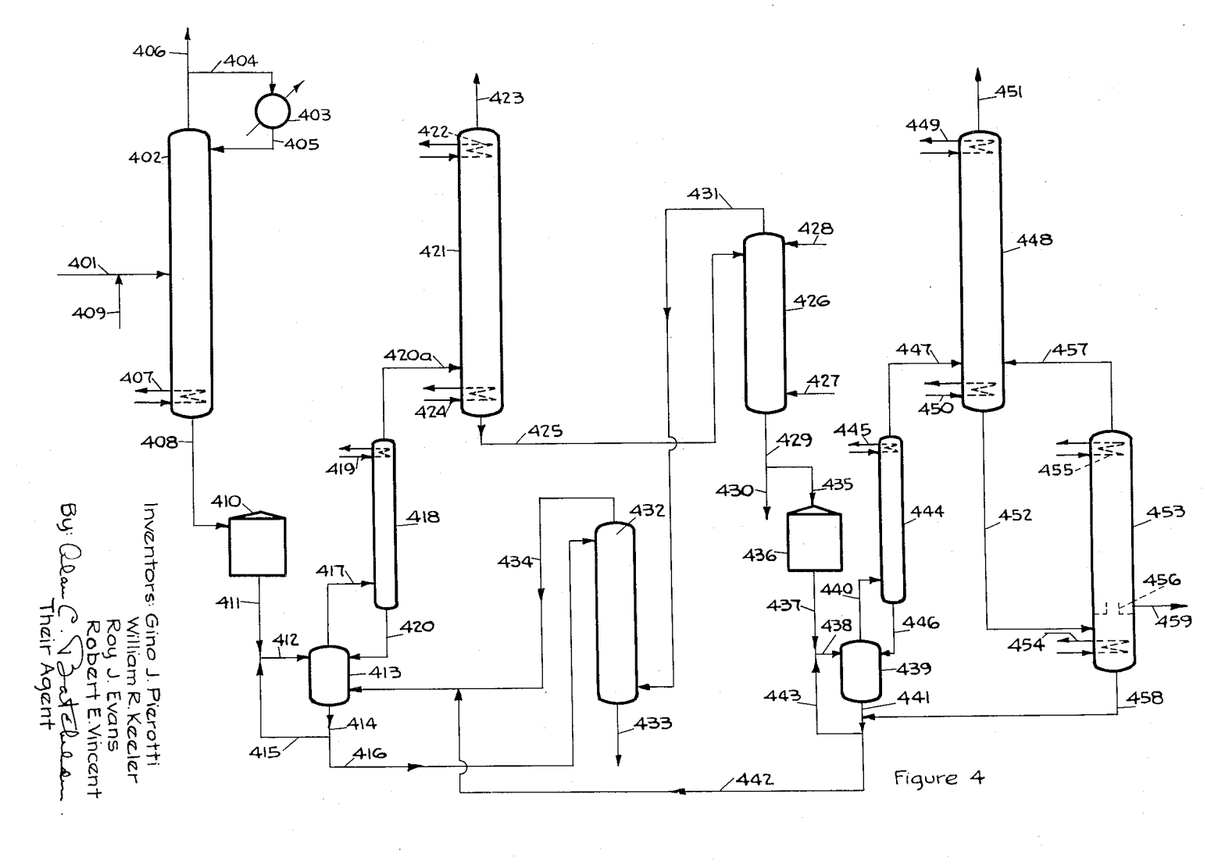
Figure 4 illustrates schematically equipment adapted for practice of the invention.

Figure 4 of the drawings illustrates in greater detail, with schematic representation of suitable apparatus, the method of the invention. Figure 4 is drawn to no scale and for the sake of simplicity various pieces of accessory equipment which may be desirable or even necessary for actual operation of the process, but which readily can be furnished by those skilled in the art, have been omitted.

A typical feed from which hydrogen peroxide is recovered and purified according to the process of the invention will be a product that has been prepared by partial oxidation of a lower secondary aliphatic alcohol under conditions which direct the oxidation to yield hydrogen peroxide rather than water as the inorganic co-product of the oxidation, the organic oxidation product being the ketone which corresponds to the secondary alcohol. The crude feed preferably will contain isopropyl alcohol as the lower aliphatic secondary alcohol and acetone as the corresponding carbonyl compound. Instead of isopropyl alcohol and acetone, secondary butyl alcohol and methyl ethyl ketone may be present as the alcohol and carbonyl compound, respectively. The process will be described, however, with particular reference to recover of hydrogen peroxide from products wherein the alcohol and carbonyl compound are isopropyl alcohol and acetone, respectively. The feed may have been produced, for example, by partial oxidation of isopropyl alcohol in the liquid state at elevated temperatures preferably between about 90° C. and about 140° C. The process can be carried out by passing gaseous oxygen preferably under superatmospheric pressure into and through the liquid alcohol in a suitable reaction vessel while carefully avoiding the presence in the reaction mixture of contaminants, such as ions of various of the heavy metals, that promote decomposition of hydrogen peroxide. Preferably, the oxidation is conducted in the presence of a hydrogen peroxide stabilizer that sequesters substances that tend to catalyze the decomposition of hydrogen peroxide to water and oxygen, particularly ions of heavy metals, such as the ferric, the cupric, and the chromic ions, preferred stabilizers being, for instance, sodium stannate, sodium aluminate, sodium silicate, alpha-metastannic acid, hydrous antimony oxide, trisodium orthophosphate, disodium monohydrogen orthophosphate, orthophosphoric acid, sodium pyrophosphate, potassium dihydrogen phosphate, pyrophosphoric acid and metaphosphoric acid. Advantageously the reactor, before it is placed on-stream, is first treated with the hydrogen peroxide stabilizer, as by rinsing with a solution thereof, and then after the oxidation has commenced and while the alcohol is fed to the reactor additional small amounts of hydrogen peroxide stabilizer are added either continuously or intermittently to the reactor, for example, by addition to the alcohol feed. A typical feed will contain from about 1% to about 20% by weight hydrogen peroxide, from about 40% to about 90% by weight isopropyl alcohol, an amount of acetone approximately stoichiometrically equivalent to the hydrogen peroxide, a minor amount of water compared to the isopropyl alcohol and other organics, and the feed will include organic peroxides varying in amount from about 1% by weight of hydrogen peroxide to an amount about equal to the hydrogen peroxide.

In the specific embodiment of the process illustrated in Figure 4 the crude feed is introduced via line 401 into fractionating column 402 which is equipped with reflux condenser 403 and reflux lines 404 and 405, overhead line 406, reboiler or internally located heating coils 407, and bottoms product line 408. In lieu of reboiler or heating coils 407, the lower end of column 402 may be heated by open steam. In lieu of the external reflux system 403, 404, and 405, an internal reflux condenser may be employed. Inlet line 409 may be provided for introduction of diluent water. Column 402 may be a fractionating column of conventional design, such as a bubble-plate, grid-tray, packed, or other suitable column, constructed of materials such as porcelain, aluminum, or stainless steel, which are compatible with hydrogen peroxide solutions. The column is one that is designed according to known methods for separation of the aqueous azeotrope of the alcohol overhead from water with the additional feature that the tray capacity together with the reboiler capacity are sufficient to give a residence time of the liquid below the feed plate between about 5 minutes and about 100 minutes, preferably between about 10 minutes and about 30 minutes. In column 402 the crude feed is fractionated at a maximum temperature (i. e., reboiler temperature) of at least about 85° C., preferably between about 90° C. and about 120° C., and most desirably between about 90° C. and about 105° C. The pressure measured at the top of the column may be varied within limits according to the desired reboiler temperature and may be maintained within the range, for example, from about 400 to about 700 mm. Hg pressure. There is taken overhead from column 402 via line 406 a mixture of the secondary alcohol-water azeotrope and the ketone, together with a part of the organic impurities, e. g., esters, acids, and other carbonylic compounds. An aqueous solution of hydrogen peroxide is withdrawn as bottoms product from the column via line 408. The bottoms product preferably should contain between about 5% and about 35% by weight hydrogen peroxide, most desirably between about 20% and about 35% by weight. If the initial feed contains insufficient water for this, the readily calculable necessary amount of diluent water may be added via line 409.

Loosely bound complexes and other labile organic peroxidic materials are largely but not wholly decomposed in column 402. Typical liquid bottoms products from column 402 will contain from about 2% to about 10% of organic materials based upon the weight of hydrogen peroxide in the product, which organic materials will include acids, esters, carbonylic compounds, alcohols, and peroxidic materials of varying degrees of stability.

Liquid bottoms product from column 402 is conveyed via line 408 to surge tank 410 and thence via lines 411 and 412 to evaporator 413. Liquid feed to evaporator 413 is continuously circulated by a pump (not shown) through lines 414, 415, and 412 in order to insure the desired low residence time in the evaporator. Evaporator 413 may be an evaporator of known design, such as a tubular evaporator, constructed preferably of stainless steel so as to minimize decomposition of the hydrogen peroxide during evaporation. Evaporator 413 is operated at a reduced pressure, preferably at a pressure between about 100 and about 250 mm. Hg, and the feed rates to the evaporator system and the rate of withdrawal of the liquid residue (via line 416) are adjusted to yield a liquid evaporation residue containing between about 50% and about 65% by weight hydrogen peroxide, or, more broadly, between about 40% and 65% by weight.

The vapors evolved in evaporator 413 are passed through line 417 to a short fractionating column 418 which we may term a knock-back column, wherein they are partially condensed by the cooling action of water circulated through internal condenser 419 or by water directly injected into the top of the column, and the condensate is returned to evaporator 413 via line 420. The vapors entering column 418 via line 417 comprise a vaporous mixture of water, hydrogen peroxide, and volatilized organic impurities having relatively low volatilities. It has been discovered that, by partially condensing these vapors, with rectification, the organic impurities can be successfully knocked back into the condensate and thereby substantially excluded from the vapors of hydrogen peroxide and water which are conveyed to the subsequent concentration column 421. Furthermore, by insertion of the short rectification column 418 between evaporator 413 and column 421, possible entrainment of impurities in the vapors entering column 421 is minimized and the efficiency of rejection of relatively non-volatile organic impurities to the evaporation residue withdrawn via line 416 is materially enhanced. Column 418 may be designed with a de-entrainment section located at the lower end thereof, just above the feed port, or a separate de-entrainer unit may be interposed in line 417. Knockback column 418 may be a grid-tray, bubble-plate, packed, or equivalent column. It should have a capacity of from about 2 to about 7 theoretical plates in order to obtain the desired concentration of and rejection of organic impurities into the liquid residue from the evaporation step, and should be operated at a reflux ratio (reflux/feed, weight basis) of from about 0.05 to about 0.20.

Vapors leaving the top of column 418 are conveyed through line 420a into fractionating column 421 provided with internal reflux condenser 422, overhead line 423, reboiler or heating coils 424, and bottoms line 425. Column 421 may be a fractionating column designed from known principles for rectification and concentration of vaporous mixtures of water and hydrogen peroxide, water being taken overhead and concentrated hydrogen peroxide solution being withdrawn as bottoms product. Column 421 is operated at pressures generally corresponding to those in the evaporator system, taking into account slight pressure drops through the connecting conduits, etc. For example, with vacuum being applied by vacuum pumps (not shown) or barometric condensers (not shown) on line 423, column 421 may be operated at a pressure measured at the top of 100 mm. Hg, a pressure measured at the bottom of 130 mm. Hg, column 418 may be operated at a mean pressure of 160 mm. Hg, and evaporator 413 may be at a pressure of about 170 mm. Hg.

The hydrogen peroxide solution withdrawn from column 421 via line 425 may contain from about 30% to about 60% by weight hydrogen peroxide. It is conveyed via line 425 to an upper portion of stripping column 426 where it is contacted countercurrently with steam introduced via inlet 427 and wherein the strippage is subjected to the refluxing action of water introduced via inlet 428. The amount of steam introduced via inlet 427 may be from about 30% to about 300%, preferably from about 50% to 100% by weight, of the liquid feed via line 425, depending upon the concentration of the liquid feed, the concentration of organic impurities therein, and the desired concentration of hydrogen peroxide in the liquid effluent from the column. The amount of reflux water introduced at inlet 428 need be but a minor amount compared to the amount of feed and may be varied suitably within the range of from about 15% to about 50% by weight of the liquid feed, depending inter alia upon the desired concentration of hydrogen peroxide in the liquid bottoms product from the column. Column 426 may be a grid-tray, bubble-plate, or other column of conventional design, constructed of materials which are compatible with hydrogen peroxide. It is preferably operated at between about 350 and about 700 mm. Hg pressure.

Liquid bottoms product is withdrawn from column 426 via line 429 and in whole or in part may be taken from the system as product via line 430 or may be subjected to the further purification and concentration, hereafter described.

Vaporous overhead product from column 426 is conveyed via line 431 to a bottom level of stripping column 432 wherein it is brought into countercurrent contact, without induced reflux, with liquid residue conveyed from evaporator 413 via line 414 and introduced into an upper level of column 432 via line 416. Column 432 may be a conventional grid-tray, bubble-plate, packed, or other column, operated at a pressure preferably between about 100 and about 350 mm. Hg and constructed, for example, of stainless steel. The weight ratio of liquid feed to gaseous feed introduced into column 432 is determined by the amount of recycle from evaporator 413, and also by the rate of introduction of steam into column 426 via inlet 427; in general, the weight ratio of liquid feed to gaseous feed to column 432 will be within the range of from about 1:10 to about 1:20. Stripped liquid product is withdrawn from column 432 via line 433 and may be discarded or treated by appropriate methods for recovery of organics therein. Vaporous overhead product from column 432 is recycled via line 434 to the preceding evaporator system and may be introduced directly into evaporator 413 or, less desirably, into a lower level of column 418 wherein it is at least in part condensed and refluxed to evaporator 413. Volatilized organics contained in recycle stream 434 pass upwardly through column 418 and thence via line 420a to column 421 from which they are discharged via line 423.

For further purification and for concentration of the product emanating from column 426 via line 429 such product is conveyed via line 435, surge tank 436, and lines 437 and 438 to evaporator 439 wherein it is continuously partially evaporated to yield a vaporous fraction withdrawn overhead via line 440 and a liquid residue withdrawn via lines 441 and 442. Recycle line 443 together with a pump (not shown) and line 438 form a system for continuous circulation of liquid through the evaporator providing the desired low residence time, preferably about 5 to 15 minutes calculated on the basis of the volume of feed (line 437) and the liquid holdup in evaporator 439.

Evaporator 439 may be an evaporator of conventional design adapted for operation at low liquid residence times. The evaporation is conducted under subatmospheric pressure, preferably between about 50 and 150 mm. Hg.

Liquid residue from evaporator 439 is withdrawn from the recirculation system via line 442 and is recycled to evaporator 413 via lines 442 and 434. The concentration of hydrogen peroxide in the liquid residue from evaporator 439 preferably is maintained between about 65% and about 80% by control of feed rate to the evaporator, reflux, and rate of withdrawal of residue via line 442.

The vaporous mixture of hydrogen peroxide and water which is evolved in evaporator 439 is conveyed through line 440 to knock-back column 444 wherein it is partially condensed and refluxed by internal condenser 445 or by the cooling action of water introduced directly into the top of the column. Column 444 may be similar in design to knock-back column 418, column 444 serving to exclude from the final product any residual impurities which may have passed through the preceding portions of the system or by chance introduced during the prior processing. Condensate, containing any residual traces of organic impurities, is returned to evaporator 439 via reflux line 446. Uncondensed vapors are conveyed via line 447 to first-stage fractionating column 448 which is cooled at the upper end by direct injection of liquid water or by internally located reflux condenser 449 and which is provided with heating coil 450 and overhead effluent line 451 which may lead to means (not shown) for maintaining the column and evaporator system under the desired subatmospheric pressure. The vaporous mixture of hydrogen peroxide and water is concentrated according to known principles by fractionation under reduced pressure in column 448, water being taken overhead via line 451 and an aqueous solution of hydrogen peroxide being withdrawn as bottoms product via line 452. This solution of hydrogen peroxide is introduced via line 452 into a lower portion of secondary fractionation column 453 which is provided with heating coil 454 in the reboiler section, reflux condenser 455, catch tray 456, and vapor return line 457. The liquid bottoms product from column 448 is further concentrated by rectification in column 453, overhead product being returned to the primary column via line 457 and a small bleed being withdrawn from the reboiler section via line 458 to prevent accumulation of any trace impurities. The bleed stream conveniently may be recycled to the evaporator system via line 458 as shown. Concentrated hydrogen peroxide is collected on catch tray 456 and is withdrawn from the system via product line 459.

Hydrogen peroxide can be recovered in excellent yield at a concentration as high as 85% and above by the method illustrated in Figure 4. High-test hydrogen peroxide thus produced has been found to be equal to or better than 90% hydrogen peroxide produced commercially by the customary electrolytic process, as judged by carbon content, pH, non-volatiles, silver weight loss test,[a] stability, and rate of catalytic decomposition.[b]

It will be appreciated, of course, that the specific arrangement of apparatus indicated by Figure 4 of the drawings is subject to certain modifications without departure from the invention. For example, where separate columns have been indicated, such columns may be appropriately combined in a single shell with the necessary suitably positioned catch-trays, vapor by-passes, condensers, etc. Supplemental equipment will be necessary, such as measuring devices and regulating devices, heat exchang-

---

[a] A standardized test in which a sample of the 90% hydrogen peroxide diluted to 30% hydrogen peroxide concentration is decomposed in contact with a weighed piece of standard silver screen. The loss in weight of the silver screen caused by the decomposition of the hydrogen peroxide while in contact therewith is taken as a sensitive test of the purity of the hydrogen peroxide.

[b] A standardized test in which the rate of decomposition of hydrogen peroxide solution in contact with a catalyst is measured. The rate of decomposition, which is notably increased by impurities in the hydrogen peroxide, is taken as a sensitive measure of the purity of the hydrogen peroxide.

ers, pumps, valves, and the like; these can be readily furnished by those skilled in the art where required. Where desirable, known stabilizers for hydrogen peroxide, such as sodium stannate, potassium pyrophosphate, 8-hydroxyquinoline, acetamide, or the like, may be introduced into the process streams at suitable points, in order to minimize any decomposition of the hydrogen peroxide during the purification thereof in and by the process of the invention. Throughout the present specification and in the claims, the pressures are given as mm. Hg, absolute.

The following table represents a typical specific application of the method of the present invention to the preparation of 90% hydrogen peroxide from a crude feed prepared by partial oxidation of isopropyl alcohol according to the methods of the hereinbefore referenced copending applications. The table is set forth with reference to the flow diagram illustrated in Figure 4.

Table

I. Primary fractionation (column 402)[a].
   A. Feed composition:
      Isopropyl alcohol, per cent by weight __________ 52.1
      Acetone, per cent by weight __________ 13.5
      Peroxy oxygen, as $H_2O_2$, per cent by weight ___ 6.5
      Water __________ 27.4
      Miscellaneous (salts, unidentified organics) per cent by weight __________ 0.5
   B. Operating conditions:
      Stillhead pressure, mm. Hg __________ 550
      Reboiler temperature, °C __________ 100
      Residence time below inlet plate, minutes __________ 23
      Reflux ratio, weight basis, reflux/product __________ 0.5
   C. Flow rates, parts by weight per hour:
      Feed __________ 169,620
      Overhead product __________ 131,603
      Bottoms product __________ 38,017
   D. Product compositions:
      Overhead, peroxide content, per cent by weight __________ 0.1
      Bottoms, $H_2O_2$ content, per cent by weight __________ 27.6
      Bottoms, organics, per cent by weight of $H_2O_2$ __________ 7.18

II. First-stage evaporation-rectification[b].
    A. Feed rate to evaporator 413, parts by weight/hour:
       From column 402 __________ 38,017
       From column 432 (line 434) __________ 60,763
    B. Operating conditions:
       Evaporator 413, pressure, mm. Hg __________ ca. 150
       Column 418, reflux ratio, weight basis reflux/feed __________ 0.12
       Column 421, pressure at top, mm. Hg __________ 110
       Column 421, temperature at bottom, °C __________ 64.4
    C. Product flow rates, parts by weight/hour:
       Overhead product, column 421 __________ [c]124,975
       Evaporator residue __________ 3,818
       Bottoms product, column 421 __________ 25,820
    D. Composition of evaporation residue:
       $H_2O_2$, per cent by weight __________ 55
       Organics, as carbon, per cent by weight of $H_2O_2$ __________ 3.8

III. First stripping column (column 426)[d].
    A. Feed rates, parts by weight per hour:
       From column 421 __________ 25,820
       Reflux water __________ 8,918
       Stripping steam __________ 59,453
    B. Operating conditions:
       Pressure, at top, mm. Hg __________ 430
       Temperature, at bottom, °C __________ 97
    C. Bottoms product, composition:
       $H_2O_2$, per cent by weight __________ 28.9
       Organics, as carbon, per cent by weight of $H_2O_2$ __________ 0.04
    D. Flow rate, bottoms product, parts by weight/hour __________ 34,466

IV. Second stripping column (column 432)[e].
    A. Operating conditions:
       Pressure, top, mm. Hg __________ 250
       Temperature, bottom, °C __________ 76
    B. Bottoms product:
       Flow rate, parts by weight per hour __________ 3,305
       $H_2O_2$ concentration, per cent by weight __________ 3.8
       Organics, as carbon, per cent by weight of $H_2O_2$ __________ 49

[a] Twenty-five actual plates, feed introduced at 15th plate from bottom.
[b] Evaporator: forced circulation; steam-heated evaporator; stainless steel construction. Reflux column 418: nine actual plates; stainless steel or porcelain construction. Fractionation column 421: twenty grid trays; aluminum construction.
[c] Recycled in part to lower end of column 418 as required to maintain concentration of the liquid evaporator residue at the desired value; net off-take 92,142 parts per hour.
[d] Forty grid trays; stainless steel or aluminum; feed introduced at 24th plate from bottom.
[e] Fifteen grid trays; stainless steel or aluminum construc- V. Second-stage evaporation-rectification[f].
   A. Flow rates, parts by weight per hour:
      Feed, from column 426 via line 435 __________ 34,466
      Overhead, column 448, withdrawn via line 451 __________ 23,521
      Bleed, line 458 __________ 110
      Product, line 459 __________ 10,280
      Evaporator residue, to evaporator 413, via line 442 __________ 665
   B. Operating conditions:
      Evaporator pressure, mm. Hg __________ 87
      Primary column pressure, top, mm. Hg __________ 35
      Secondary column pressure, top, mm. Hg __________ 67
      Secondary column temperature, bottom, °C __________ 82.2
      Evaporation residue; $H_2O_2$, per cent by weight __________ 76

[f] Evaporator: forced circulation; steam heated evaporator; stainless steel construction. Reflux column 444: six grid trays; aluminum construction. Primary column, 448: eight grid trays; aluminum construction. Secondary column, 453: three grid trays plus one draw-off tray; tin-lined, pure aluminum, or porcelain construction.

We claim as our invention:

1. A process for purifying aqueous hydrogen peroxide solution containing lower aliphatic alcohol, lower aliphatic carbonyl compound corresponding to the alcohol, and organic impurities comprising other oxygenated organic compounds than the alcohol and carbonyl compound and including organic peroxidic materials of divergent volatilities and stabilities, comprising fractionally distilling said solution in a first fractionation zone to yield as overhead product an aqueous mixture of lower aliphatic alcohol and corresponding carbonyl compound and as bottoms product an aqueous solution of hydrogen peroxide comprising residual organics, in a separate evaporation zone partially evaporating said bottoms product to yield a vaporous mixture comprising hydrogen peroxide, water, and relatively volatile organics and a liquid residue comprising water, hydrogen peroxide, and residual organics, in a second fractionating zone rectifying said vaporous mixture to yield aqueous overhead fraction comprising relatively volatile organics and as liquid bottoms fraction an aqueous hydrogen peroxide solution comprising residual relatively volatile organics, in a first stripping zone conveying said liquid bottoms fraction countercurrently to a stream of steam introduced thereinto so as to volatilize organic impurities without substantial volatilization of hydrogen peroxide, introducing the vaporous effluent from said first stripping zone into a second stripping zone and therein passing it countercurrently to liquid residue conveyed from the said evaporation zone to said second stripping zone to yield as overhead product a mixture of water, hydrogen peroxide and volatile organics and as liquid bottoms an aqueous solution of less volatile organics, introducing the overhead fraction from said second stripping zone into said evaporation zone, and withdrawing purified aqueous hydrogen peroxide solution as bottoms product of said first stripping zone.

2. The process defined by claim 1 in which the purified hydrogen peroxide solution withdrawn from the first stripping zone is at least partially evaporated in a second evaporation zone and the resulting vaporous mixture of water and hydrogen peroxide is rectified to yield concentrated and purified hydrogen peroxide solution.

3. The process defined by claim 2 in which liquid residue from said second evaporation zone is recycled to the first said evaporation zone.

4. The process defined by claim 1 in which the lower aliphatic alcohol is isopropyl alcohol and the corresponding carbonyl compound is acetone.

5. A process for purifying aqueous hydrogen peroxide solution containing lower aliphatic alcohol, lower aliphatic carbonyl compound corresponding to the alcohol, and organic impurities comprising other oxygenated organic compounds than the alcohol and carbonyl compound and including organic peroxidic materials of divergent volatilities and stabilities, comprising fractionally distilling said solution in a first fractionation zone to yield as overhead product an aqueous mixture of lower aliphatic alcohol and corresponding carbonyl compound tion.

and as bottoms product an aqueous solution of hydrogen peroxide comprising residual organics in a separate evaporation zone partially evaporating said bottoms product to yield a vaporous mixture comprising hydrogen peroxide, water, and volatilized organics and a liquid residue comprising water, hydrogen peroxide, and residual organics, partially condensing said vaporous mixture with rectification to yield as reflux to the evaporation zone a liquid condensate comprising said volatilized organics, water, and hydrogen peroxide, in a second fractionating zone rectifying the uncondensed portion of said vaporous mixture to yield a vaporous overhead fraction comprising relatively volatile organics and as liquid bottoms fraction an aqueous hydrogen peroxide solution comprising residual relatively volatile organics, in a first stripping zone conveying said liquid bottoms fraction countercurrently to a stream of steam introduced thereinto so as to volatilize organic impurities without substantial volatilization of hydrogen peroxide, introducing the vaporous effluent from said first stripping zone into a second stripping zone and therein passing it countercurrently to liquid residue conveyed from the said evaporation zone to said second stripping zone to yield as overhead product a mixture of water, hydrogen peroxide and volatile organics and as liquid bottoms an aqueous solution of less volatile organics, introducing the overhead fraction from said second stripping zone into said evaporation zone, and withdrawing purified aqueous hydrogen peroxide solution as bottoms product of said first stripping zone.

6. The process defined by claim 5 in which the lower aliphatic alcohol is isopropyl alcohol and the corresponding carbonyl compound is acetone.

7. A process for purifying aqueous hydrogen peroxide solution containing lower aliphatic alcohol, lower aliphatic carbonyl compound corresponding to the alcohol, and organic impurities comprising other oxygenated organic compounds than the alcohol and carbonyl compound and including organic peroxidic materials of divergent volatilities and stabilities, comprising fractionally distilling said solution in a first fractionating zone to yield as overhead product an aqueous mixture of lower aliphatic alcohol and corresponding carbonyl compound and as bottoms product an aqueous solution of hydrogen peroxide comprising residual organics, in a separate evaporation zone evaporating said bottoms product to yield a vaporous mixture comprising hydrogen peroxide, water, and relatively volatile organics and a liquid residue comprising water, hydrogen peroxide and residual organic impurities, in a second fractionating zone rectifying said vaporous mixture to yield an aqueous overhead fraction and as liquid bottoms fraction an aqueous hydrogen peroxide solution comprising residual organic impurities, in a first stripping zone conveying said aqueous hydrogen peroxide solution countercurrently to a stream of steam introduced thereinto so as to volatilize organic impurities without substantial volatilization of hydrogen peroxide, recycling overhead effluence of said first stripping zone back to said separate evaporation zone, and withdrawing purified aqueous hydrogen peroxide solution as bottoms product from said first stripping zone.

8. The process defined by claim 7 in which effluence of said first stripping zone is introduced into said separate evaporation zone at least in part by condensation in admixture with vapors evolved from the evaporation zone.

9. A process for purifying aqueous hydrogen peroxide solution containing lower aliphatic alcohol, lower aliphatic carbonyl compound corresponding to the alcohol, and organic impurities comprising other oygenated organic compounds than the alcohol and carbonyl compound and including organic peroxidic materials of divergent volatilities and stabilities, comprising fractionally distilling said solution in a first fractionation zone to take lower aliphatic alcohol and corresponding carbonyl compound overhead and to leave as bottoms product an aqueous solution of hydrogen peroxide comprising residual organics, in a separate evaporation zone partially evaporating said bottoms product to yield a vaporous mixture comprising hydrogen peroxide, water, and volatilized organics, and a liquid residue comprising water, hydrogen peroxide, and residual organics, partially condensing said vaporous mixture with rectification to yield as reflux to the evaporation zone a liquid condensate comprising said volatilized organics, water, and hydrogen peroxide, in a second fractionation zone rectifying the uncondensed portion of said vaporous mixture to yield as bottoms product an aqueous solution of hydrogen peroxide and as overhead fraction essentially water, and withdrawing bottoms product from said evaporation zone and aqueous solution of hydrogen peroxide from said second fractionation zone.

10. The process defined by claim 9 in which the lower aliphatic alcohol is isopropyl alcohol and the corresponding carbonyl compound is acetone.

11. In a process for purifying an aqueous hydrogen peroxide solution produced by partial oxidation of a lower aliphatic alcohol to yield a product comprising hydrogen peroxide, unconsumed alcohol, carbonylic compound corresponding to the alcohol, and small amount of organic impurities, and wherein alcohol and corresponding carbonylic compound have been removed from the crude oxidation product, the steps which comprise partially evaporating said aqueous hydrogen peroxide solution to leave a liquid residue containing from about 40% to about 65% by weight hydrogen peroxide and to produce a vaporous mixture comprising hydrogen peroxide and water, partially condensing the vaporous mixture in a rectification zone having the equivalent of from about 2 to about 7 theoretical plates, returning the condensate to the liquid residue, and in a separate rectification zone rectifying the uncondensed vapors to effect concentration of the hydrogen peroxide therein.

12. A method of purifying and concentrating a solution of hydrogen peroxide in water containing, as organic impurities, organic materials which are produced as minor by-products in and by partial oxidation of a lower aliphatic alcohol under conditions productive of hydrogen peroxide and the carbonyl compound corresponding to the alcohol, wherein the aqueous solution is subjected to partial evaporation to yield a vaporous mixture comprising hydrogen peroxide and water and a liquid residue containing from about 40% to about 70% by weight hydrogen peroxide, the vaporous mixture is partially condensed with reflux in a rectification zone having the equivalent of from about 2 to about 7 theoretical plates, the condensate is returned and combined with liquid the residue, and the uncondensed portion of the vaporous mixture is separately rectified to yield as bottoms fraction an aqueous solution of hydrogen peroxide and as overhead fraction essentially water.

13. A process for concentrating and purifying an aqueous solution of hydrogen peroxide containing as impurities oxygenated organic compounds including organic peroxide materials of divergent volatilities and stabilities, which process comprises successive partial evaporation and rectification of the evolved vapors in each of a plurality of evaporation-rectification stages in sequence, removal from the system of a stream comprising essentially water as rectifier overhead in each of said stages, steam stripping of rectifier bottoms product intermediately to two of said stages to volatilize impurities from such bottoms product, separate steam stripping of liquid residue from at least one of such successive evaporations to volatilize hydrogen peroxide therefrom, recycle of steam and volatilized impurities from the first-mentioned to the second-mentioned stripping operation and recycle of steam, hydrogen peroxide and volatile impurities from said second-mentioned stripping operation to an evaporation-rectification stage preceding in sequence said first-mentioned stripping operation, and withdrawal of purified and concentrated hydrogen peroxide from the terminal of said stages.

14. A process for purifying an aqueous hydrogen peroxide solution containing lower aliphatic alcohol and lower aliphatic carbonyl compound corresponding to the alcohol, and organic impurities comprising other oxygenated organic compounds than the alcohol and carbonyl compound and including organic peroxidic materials of divergent stabilities and volatilities, comprising fractionally distilling said solution in a first fractionating zone to yield as overhead product an aqueous mixture of lower aliphatic alcohol and corresponding carbonyl compound and as bottoms product an aqueous solution of hydrogen peroxide comprising residual organics, in a separate evaporation zone partially evaporating said bottoms product under a subatmospheric pressure to yield a vaporous mixture comprising hydrogen peroxide, water, and relatively volatile organics and a liquid residue comprising between about 40% and about 70% by weight hydrogen peroxide, in a second fractionating zone rectifying said vaporous mixture to yield an aqueous overhead fraction and as liquid bottoms fraction an aqueous hydrogen peroxide solution comprising residual organic impurities, introducing said liquid bottoms fraction into a stripping zone and therein contacting it countercurrently with a stream of steam introduced into a lower level of the stripping zone, whereby organic impurities are stripped from said liquid bottoms fraction without substantial volatilization of hydrogen peroxide, withdrawing vaporous overhead from said stripping zone, and withdrawing purified hydrogen peroxide solution as liquid bottoms product of said stripping zone.

15. The process defined by claim 1 in which the lower aliphatic alcohol is secondary butyl alcohol and the corresponding carbonyl compound is methyl ethyl ketone.

16. The process defined by claim 5 in which the lower aliphatic alcohol is secondary butyl alcohol and the corresponding carbonyl compound is methyl ethyl ketone.

17. The process defined by claim 9 in which the lower aliphatic alcohol is secondary butyl alcohol and the corresponding carbonyl compound is methyl ethyl ketone.

References Cited in the file of this patent

UNITED STATES PATENTS

| | | |
|---|---|---|
| 2,124,257 | Mercier | July 19, 1939 |
| 2,178,496 | Schmidt | Oct. 31, 1939 |
| 2,282,184 | Harrower et al. | May 5, 1942 |
| 2,461,988 | Kooijman | Feb. 15, 1949 |
| 2,684,889 | Crewson et al. | July 27, 1954 |

FOREIGN PATENTS

| | | |
|---|---|---|
| 970,103 | France | Dec. 29, 1950 |